US008355572B2

(12) United States Patent
Stevens (10) Patent No.: US 8,355,572 B2
(45) Date of Patent: Jan. 15, 2013

(54) MAPPING AN OUT OF GAMUT RGB COLOR TO A GAMUT SURFACE

(75) Inventor: Michael T. Stevens, Aloha, OR (US)

(73) Assignee: Xerox Corporation, Norwalk, CT (US)

(*) Notice: Subject to any disclaimer, the term of this patent is extended or adjusted under 35 U.S.C. 154(b) by 967 days.

(21) Appl. No.: 12/402,805

(22) Filed: Mar. 12, 2009

(65) Prior Publication Data
US 2010/0232693 A1 Sep. 16, 2010

(51) Int. Cl.
G06K 9/00 (2006.01)
G09G 5/02 (2006.01)
(52) U.S. Cl. ........................ 382/167; 345/590
(58) Field of Classification Search .................. 382/162, 382/167; 345/590; 358/520
See application file for complete search history.

(56) References Cited

U.S. PATENT DOCUMENTS

2004/0170319 A1* 9/2004 Maurer .................... 382/167
2005/0157940 A1* 7/2005 Hosoda et al. ............ 382/266

OTHER PUBLICATIONS

Zolliker et al. ("Continuity of gamut mapping algorithms," J. Electronic Imaging 15(1), Jan.-Mar. 2006, 12 pages).*
Yang et al. ("Efficient gamut clipping for color image processing using LHS and YIQ," Optical Engineering, vol. 42, Mar. 2003, pp. 701-711).*

* cited by examiner

Primary Examiner — Yubin Hung
(74) Attorney, Agent, or Firm — Philip E. Blair; Fleit Gibbons Gutman Bongini & Bianco P.L.

(57) ABSTRACT

What is disclosed is a system and method for mapping an out of gamut RGB color to a surface of a color gamut in RGB space. A point $x_c$ having $\{R_c\ G_c\ B_c\}$ values in RGB space is identified which is outside a surface of a color gamut of a target device. A lightness value $\gamma$ and a chroma vector $\vec{C}=[C_r, C_g, C_b]$ are determined from the $\{R_c\ G_c\ B_c\}$ values of the identified point. A minimum and a maximum saturation are determined for point $x_c$. A new lightness value $\gamma'$ and a new chroma vector $\vec{C}'$ are calculated based on the minimum and maximum saturation values, in a manner as is described herein in detail. The new lightness $\gamma'$ and the new chroma vector $\vec{C}'$ are converted back into $\{R'_c\ G'_c\ B'_c\}$ values. The $\{R'_c\ G'_c\ B'_c\}$ values are provided to a gamut mapping function.

12 Claims, 5 Drawing Sheets

MAPPING AN OUT OF GAMUT RGB COLOR TO A GAMUT SURFACE

TECHNICAL FIELD

The present invention is directed to methods for mapping an out of gamut color to a surface of a color gamut in a color management system performing a gamut mapping function.

BACKGROUND

In many color adjustment algorithms, input RGB color values are commonly adjusted outside of the device gamut. These color values must be mapped back to in-gamut colors in order to be processed by the printing device. Gamut clipping is a common method which is often used to accomplish this objective. In one gamut clipping method, each RGB channel is clipped to a range between [0,1]. Such a method is simple and efficient but can produce undesirable hue shifts and posterization. Posterization is a process in photograph development which converts normal photographs into an image consisting of distinct, but flat, areas of different tones or colors. Posterization of an image occurs when a region of an image with a continuous gradation of tone is replaced with several regions of fewer tones, resulting in an abrupt change from one tone to another. A posterized image often has the same general appearance, but portions of the original image that presented gradual transitions are replaced by abrupt changes in shading and gradation from one area of tone to another. On the other hand, more elaborate gamut mapping algorithms are known but these generally operate in L*a*b* space which involves an increase in computational complexity and increased processing.

Accordingly, what is needed in this art are increasingly sophisticated systems and methods for mapping out-of-gamut RGB colors to a gamut surface which avoids the posterization problems often associated with gamut clipping.

BRIEF SUMMARY

What is provided are a novel system and method for mapping an out of gamut RGB color to a surface of a color gamut in RGB space. The method operates in RGB space using a pseudo four channel perceptual approximation to lightness and chroma. A lightness-preserving mapping and a chroma-preserving mapping are calculated and blended according to an adjustable parameter using linear interpolation. Lightness and chroma values representing the mapped point are then converted to RGB values. The present method provides a computationally efficient method of gamut mapping for RGB images.

In one example embodiment, the present method for mapping an out of gamut RGB color to a surface of a color gamut involves the following. A point $x_c$ having $\{R_c G_c B_c\}$ values in RGB space is identified which is outside a surface of a color gamut of a target device. A lightness value $\gamma$ and a chroma vector $\vec{C}=[C_r, C_g, C_b]$ are determined from the $\{R_c G_c B_c\}$ values of the identified point. The lightness value is then clipped to a range between [0,1]. A minimum $a_0$ and a maximum saturation $a_2$ are determined for point $x_c$. A new lightness value $\gamma'$ and a new chroma vector $\vec{C}$, are calculated which constrains the chroma vector to the hue of input point $x_c$. In one embodiment, this comprises, if $(a_2-a_0) \geq 1$, scaling the chroma vector, $$\vec{C} = \frac{1}{a_2 - a_0} \vec{C},$$

and calculating a new lightness value, $\gamma'=\frac{1}{2}(1+a_1)-\gamma$. Otherwise, if $(a_2+\gamma)>1$, the new lightness value becomes: $\gamma'=1-(a_2+\gamma)$. Otherwise, if $(a_0+\gamma)<0$, the new lightness value becomes: $\gamma'=-a_0-\gamma$. The chroma vector and the new lightness value are then scaled in a direction of lightness or darkness according to a user-defined saturation parameter $\sigma$, where $\sigma$ is a saturation parameter $0 \leq \sigma \leq 1$. If $(\gamma'>0)$, then the chroma vector is scaled towards a darkness solution:

$$\vec{C} = \left(\frac{(1-\gamma-\sigma\gamma')}{(1-\gamma-\gamma')}\right)\vec{C}.$$

If $(\gamma'<0)$, the new chroma vector is scaled towards a lightness solution:

$$\vec{C} = \left(\frac{(\gamma+\sigma\gamma')}{(\gamma+\gamma')}\right)\vec{C}.$$

The new lightness value is then scaled by the saturation parameter such that: $\gamma'=\sigma\gamma'$. The new lightness value and the new chroma vector are converted back into $\{R'_c G'_c B'_c\}$ values and these are provided to an image processing system.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for mapping an out of gamut RGB color to a surface of a color gamut in RGB space. The present method provides a computationally efficient method of gamut mapping for RGB images. The method operates in RGB space using a pseudo four channel perceptual approximation to lightness and chroma.

It should be understood that one of ordinary skill in this art would be readily familiar with many facets of color science such as, but not limited to, color space, color gamuts, gamut mapping, and other related techniques and algorithms commonly found in the color science arts such as, for instance, color management, device color characterization, digital halftoning, color quantization, computationally efficient transform algorithms, and image processing. Those of ordinary skill would be familiar with the text: "*Digital Color Imaging Handbook*", 1$^{st}$ Ed. CRC Press (2003), ISBN-10: 084930900X, ISBN-13: 978-0849309007, which is incorporated herein in its entirety by reference. Additionally, one of ordinary skill would also be familiar with advanced mathematical techniques used for color manipulation and various color transformation processes. One of ordinary skill would be knowledgeable about computer science and software and hardware programming systems and methods sufficient to implement the functionality and capabilities described herein in their own computing environments without undue experimentation.

A color gamut refers to a complete subset of colors as defined by the spectrum of light, i.e., the distribution of light energy versus wavelength, which can be accurately represented in a given circumstance, such as within a given color space or by a certain output device. Digitizing a photograph, converting a digitized image to a different color space, or outputting the image using an image output device generally alters its gamut, in the sense that some of the colors in the original image are lost in a color transformation process which translates an input color space to an output color space using mathematical algorithms. The mathematical algorithms of the color profiles for a color transformation process may be convolved to a single mathematical algorithm for efficiency. The gamut of a color marking device, for example, is a multi-dimensional color space having a given volume with the axes of the space being defined by the pigments used in the colorants of the primary colors. Each of the primary colors is transferred to the image-receiving medium.

An image processing system refers to a hardware or software system capable of processing an image for output to an image output device. Such a system incorporate or be in communication with a color management system which may further incorporate a gamut mapping function.

An image output device refers to a marking device capable of reducing a signal of an image to viewable form. The set of image output devices includes printers, xerographic devices, image production and photographic equipment, monitors and other display devices, and the like. Outputting an image means communicating the image to an image output device. Such communication may take the form of transmitting the image in the form of signals over a network or other communication pathway, or storing the signals to a memory media or storage device. A color marking device, such as an inkjet printer, is one example of an image output device which produces an image from received signals onto a substrate by the visual integration of colored inks deposited thereon. An image input device refers to devices for receiving an image. Such devices include scanners, cameras, copiers, facsimile devices, photo reproduction equipment, and the like.

Figure 1:
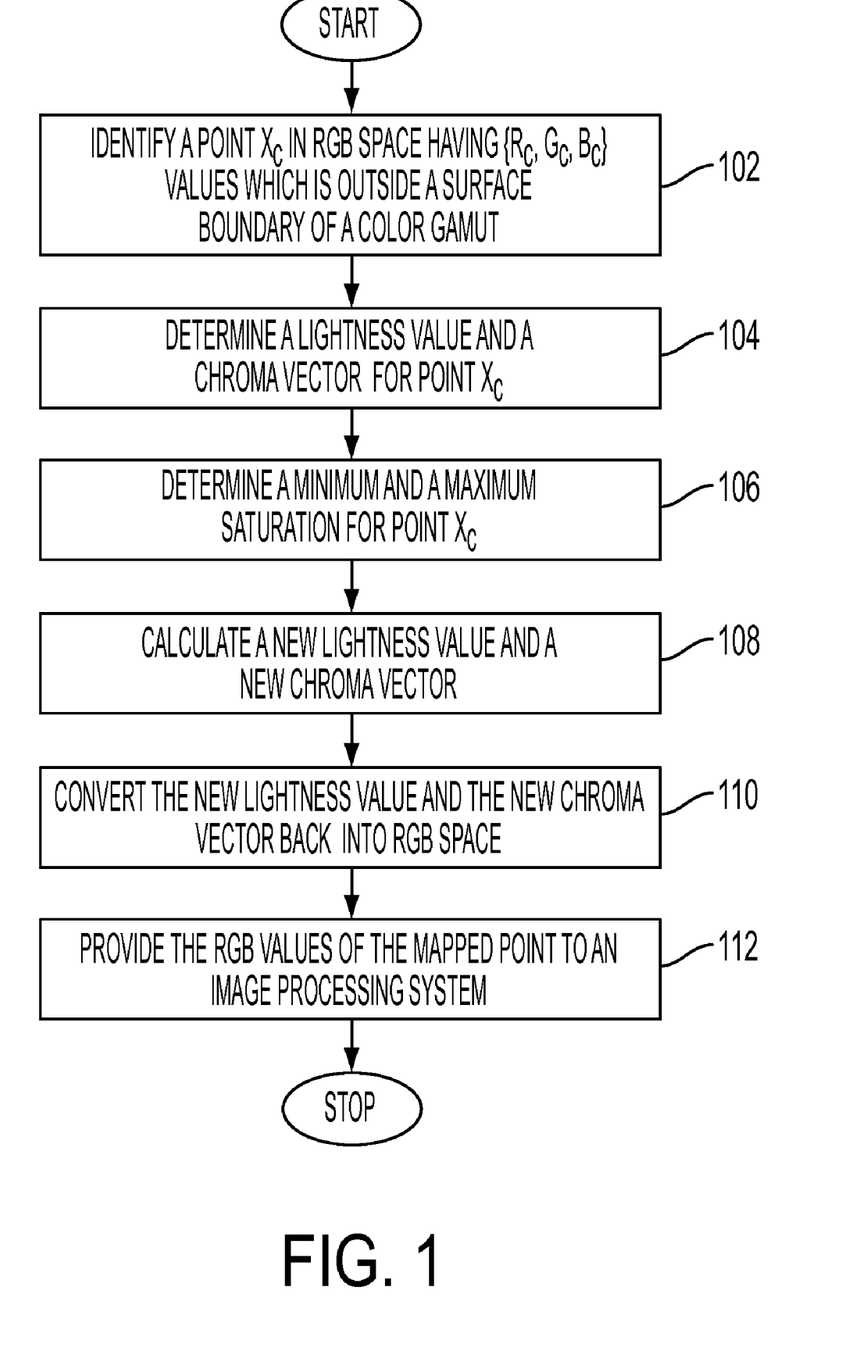
FIG. 1 is a flow diagram of one example embodiment of the present method for mapping an out-of-gamut RGB point to a surface of a color gamut of a target marking device.

Reference is now being made to FIG. 1 which is a flow diagram of one example embodiment of the present method for mapping an out of gamut color point to a surface of a color gamut of a target marking device. The present method maps the input color point to the gamut surface while minimizing the change in the chroma vector, with the chroma vector constrained to the input hue. In one example embodiment, the present method involves the following.

At step 102, a point $x_c$ having $\{R_c\ G_c\ B_c\}$ values in RGB space is identified. The point $x_c$ is a point which is outside a surface of a color gamut of a target image output device.

At step 104, a lightness value $\gamma$ and a chroma vector $\vec{C}$ are determined from the $\{R_c\ G_c\ B_c\}$ values of the identified point.

At step 106, a minimum saturation, $a_0$, and a maximum saturation, $a_2$, of point $x_c$ are determined. In one embodiment, the minimum saturation $a_0$=MIN($C_r$, $C_g$, $C_b$), and the maximum saturation $a_2$=MAX($C_r$, $C_g$, $C_b$).

At step 108, a new lightness value $\gamma'$ and a new chroma vector $\vec{C}$ are calculated. In a manner as will be described in further detail herein, the determination of the new lightness value and the new chroma vector is based, in part on the minimum and maximum saturation values and the lightness value and the chroma vector of the identified point. The new lightness value and the new chroma vector are scaled in a direction of lightness or darkness. The scaling moves the point along the surface of the gamut to a new point.

At step 110, the new lightness value and the new chroma vector of the new point are then converted to $\{R'_c\ G'_c\ B'_c\}$ values.

At step 112, the $\{R'_c\ G'_c\ B'_c\}$ values are provided to an image processing system.

The present method operates in RGB space using a pseudo four channel perceptual approximation to lightness and chroma which is then adjusted according to a pre-defined saturation parameter in a direction of lightness or darkness as determined by the saturation. Example software code to perform the present method is provided.

Figure 2:
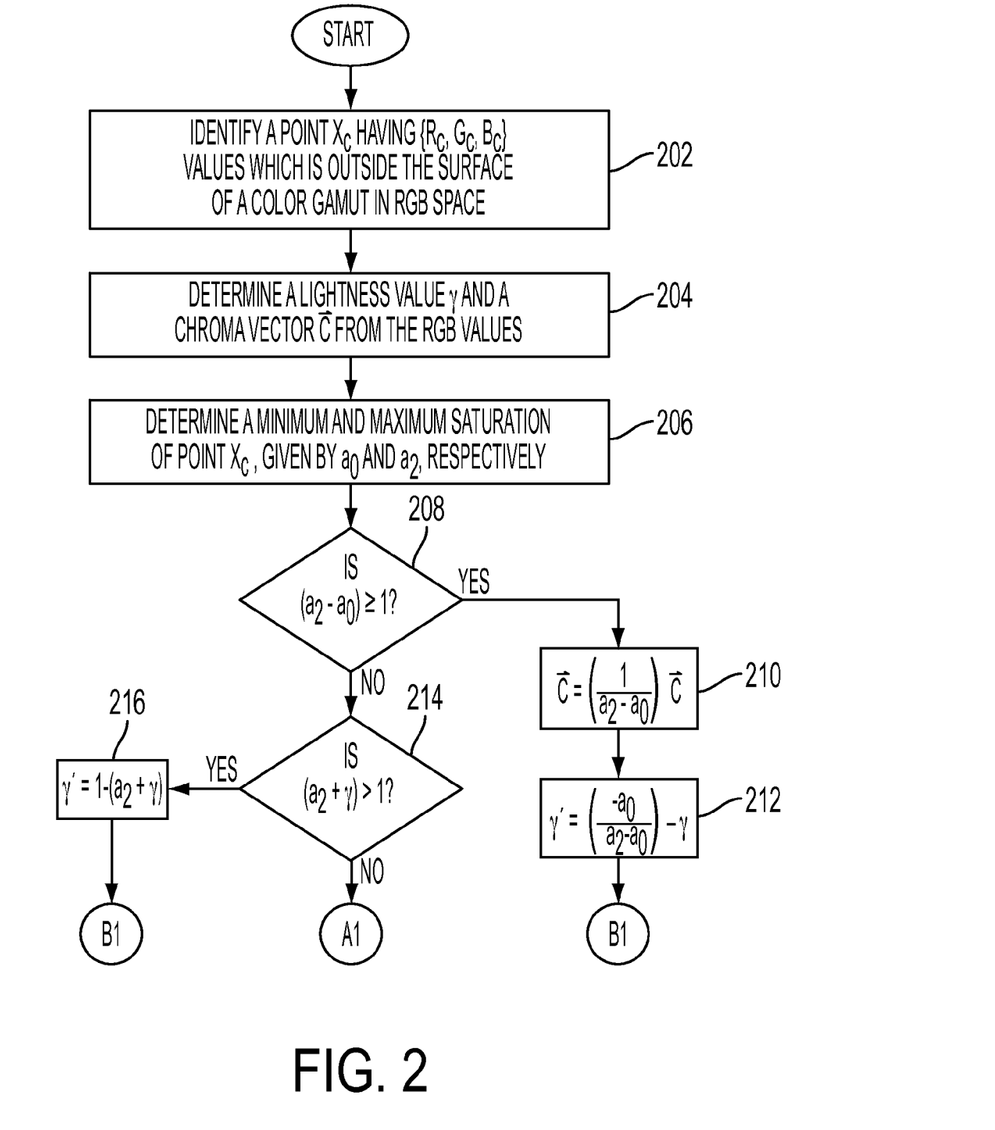
FIG. 2 is a flow diagram of another embodiment of the present method for mapping an out-of-gamut point to a surface of a color gamut in RGB space.

Reference is now being made to FIG. 2 which is a flow diagram of another embodiment of the present method for mapping an out-of-gamut point to a surface of a color gamut in RGB space.

At step 202, a point $x_c$ is identified which outside a surface of a color gamut of a target device. The identified points has $\{R_c\ G_c\ B_c\}$ values in RGB space. Methods for determining whether a color is inside or outside a boundary surface of a color gamut in RGB space are well established. In one example, a color point is out-of-gamut if any of the RGB values are less than zero or greater than one. This determination can be made, for example, according to the following line of pseudo code:

if ((R<0.0 OR R>1.0) OR (G<0.0 OR G>1.0) OR (B<0.0 OR B>1.0)).

If any of the above are true, then the point is determined to be outside the boundary surface of the target gamut.

Point $x_c$ may be, for example, a spot color for which a determination needs to be made by a color management system in the image path. If the identified point is outside the boundary surface of the color gamut of the target color marking device then the point is further processed by, for example, providing the point to a gamut mapping function wherein the point is mapped to its nearest in-gamut color using, for instance, a lookup table (LUT) in a manner which is well known in this art.

At step 204, a lightness value $\gamma$ and a chroma vector $\vec{C}$ are determined from the $\{R_c\ G_c\ B_c\}$ values. The lightness value $\gamma$ is approximated from the $\{R_c\ G_c\ B_c\}$ values of the identified point. In one embodiment, the lightness value is determined by:

$$\gamma = \tfrac{1}{3}(R_c + G_c + B_c). \tag{1}$$

The lightness value is preferably clipped to a value in the range between [0,1] such that blacker than black colors are clipped to black and whiter than white colors are clipped to white.

The chroma vector $\vec{C}$ is composed of $[C_r, C_g, C_b]$ components, where $[C_r+C_g+C_b]=0$. The chroma vector is approximated from the lightness value $\gamma$ and the $\{R_c\ G_c\ B_c\}$ values of the identified point. In one embodiment, this chroma vector is determined by:

$$\vec{C} = \begin{bmatrix} C_r \\ C_g \\ C_b \end{bmatrix} = \begin{bmatrix} R_c - \gamma \\ G_c - \gamma \\ B_c - \gamma \end{bmatrix}. \quad (2)$$

At step 206, a minimum and a maximum saturation of point $x_c$ is determined. In one embodiment, these are determined as follows.

The minimum saturation value, in one embodiment, is determined by:

$$a_0 = \text{MIN}(C_r, C_g, C_b). \quad (3)$$

The maximum saturation value, in one embodiment, is determined by:

$$a_2 = \text{MAX}(C_r, C_g, C_b). \quad (4)$$

An intermediate saturation value, in one embodiment, is determined by:

$$a_1 = -a_2 - a_0. \quad (5)$$

Next, a determination is made whether the saturation needs to be clipped.

At step 208, if $(a_2 - a_0) \geq 1$, then, at step 210, the chroma vector is clipped to the most saturated color on that particular hue leaf on the color gamut:

$$\vec{C} = \frac{1}{a_2 - a_0} \begin{bmatrix} C_r \\ C_g \\ C_b \end{bmatrix}. \quad (6)$$

The most saturated color will most likely have a different lightness than the input color point. A new lightness value is determined. In one embodiment, the determination for the new lightness value proceeds as follows:

$$a_2 - a_0 = 1, \quad (7)$$

$$\gamma' = -a_0 - \gamma. \quad (8)$$

Solving for $a_0$ in Eq. 7 and substituting into Eq. 8 yields:

$$\gamma' = 1 - a_2 - \gamma. \quad (9)$$

Adding Eqs. 8 and 9 produces:

$$2\gamma' = 1 - a_2 - a_0 - 2\gamma. \quad (10)$$

Solving for $a_2$ in Eq. 5 and substituting into Eq. 10 yields:

$$2\gamma' = 1 + a_1 - 2\gamma \quad (11)$$

Dividing Eq. 11 by 2 yields, at step 212, the new lightness value:

$$\gamma' = \frac{-a_0}{a_2 - a_0} - \gamma \quad (12)$$

Figure 3:
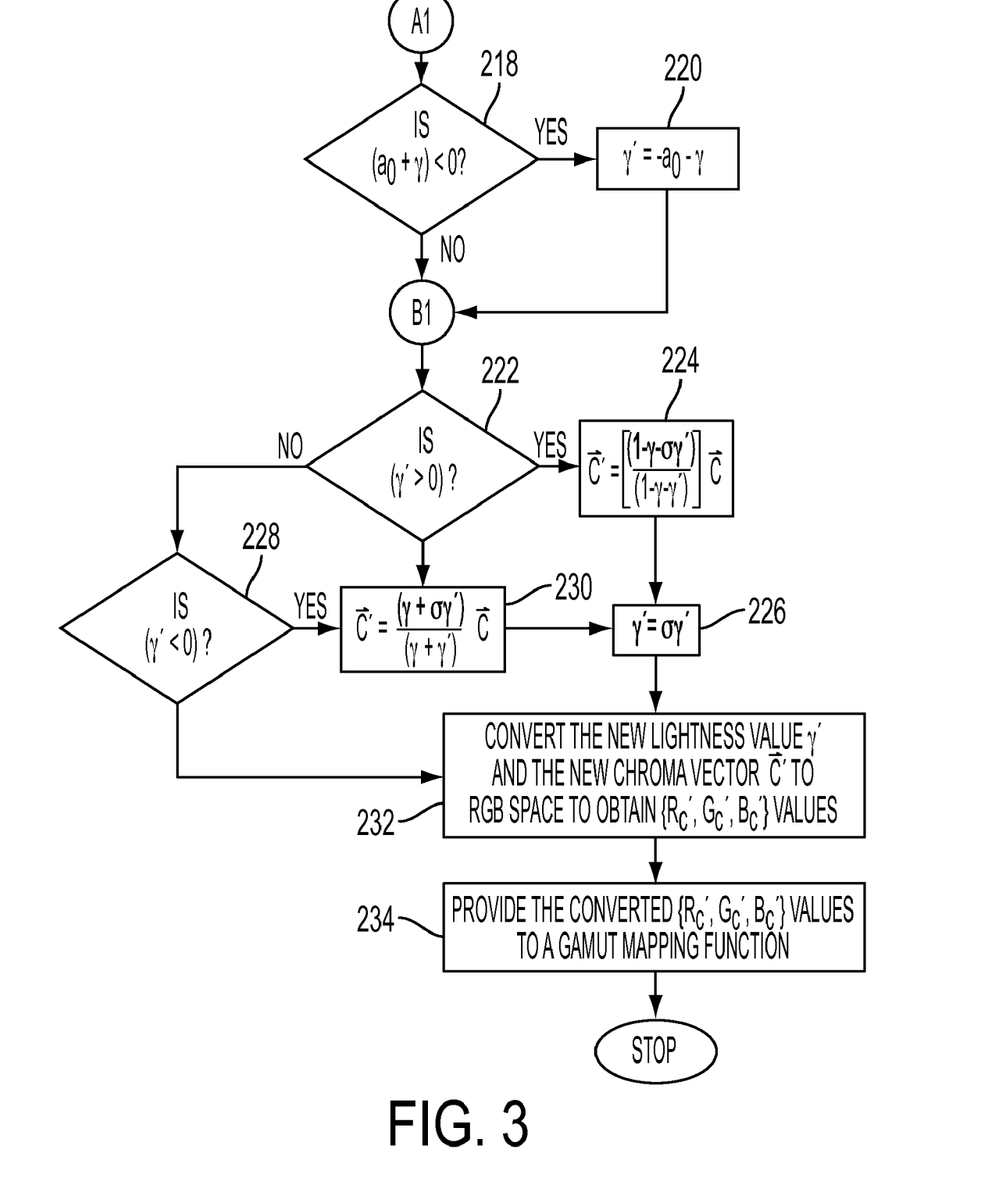
FIG. 3 which is a continuation of the flow diagram of FIG. 2 with processing continuing with respect to node A1.

Thereafter, processing continues with respect to node B1 of FIG. 3.

Otherwise, at step 214, if $(a_2+\gamma)>1$, then, at step 216, $$\gamma' = 1 - (a_2 + \gamma). \quad (13)$$

and processing continues with respect to node B1 of FIG. 3. If not, then processing continues with respect to node A1 of FIG. 3.

Reference is now being made to FIG. 3 which is a continuation of the flow diagram of FIG. 2 with processing continuing with respect to node A1.

At step 218, if $(a_0+\gamma)<0$, then, at step 220, $$\gamma' = -a_0 - \gamma. \quad (14)$$

Thereafter, processing continues with respect to node B1.
At step 222, if $(\gamma'>0)$, then, at step 224, $$\vec{C} = \left(\frac{(1-\gamma-\sigma\gamma')}{(1-\gamma-\gamma')}\right)\vec{C}. \quad (15)$$

At step 226, $$\gamma' = \sigma\gamma', \quad (16)$$

where $\sigma$ is a saturation parameter in the range of: $0 \leq \sigma \leq 1$. This scales toward a darker solution. One recommended saturation parameter value is in the range of $0 < \sigma \leq 0.3$.

Otherwise, at step 228, if $(\gamma'<0)$, then at step 230, $$\vec{C} = \left(\frac{(\gamma+\sigma\gamma')}{(\gamma+\gamma')}\right)\vec{C}. \quad (17)$$

Thereafter, processing continues with respect to step 226, as discussed above. If $(\gamma'=0)$ then there is no change of lightness and the new lightness value equals the old lightness value.

At step 232, the new lightness value and the new chroma vector are converted to $\{R'_c\ G'_c\ B'_c\}$ values. In one embodiment, this conversion is as follows:

$$\begin{bmatrix} R'_c \\ G'_c \\ B'_c \end{bmatrix} = \begin{bmatrix} \gamma+\gamma' \\ \gamma+\gamma' \\ \gamma+\gamma' \end{bmatrix} + \begin{bmatrix} c'_r \\ c'_g \\ c'_b \end{bmatrix}. \quad (18)$$

At step 234, the $\{R'_c\ G'_c\ B'_c\}$ values are provided to a gamut mapping function of a color management system.

Figure 4:
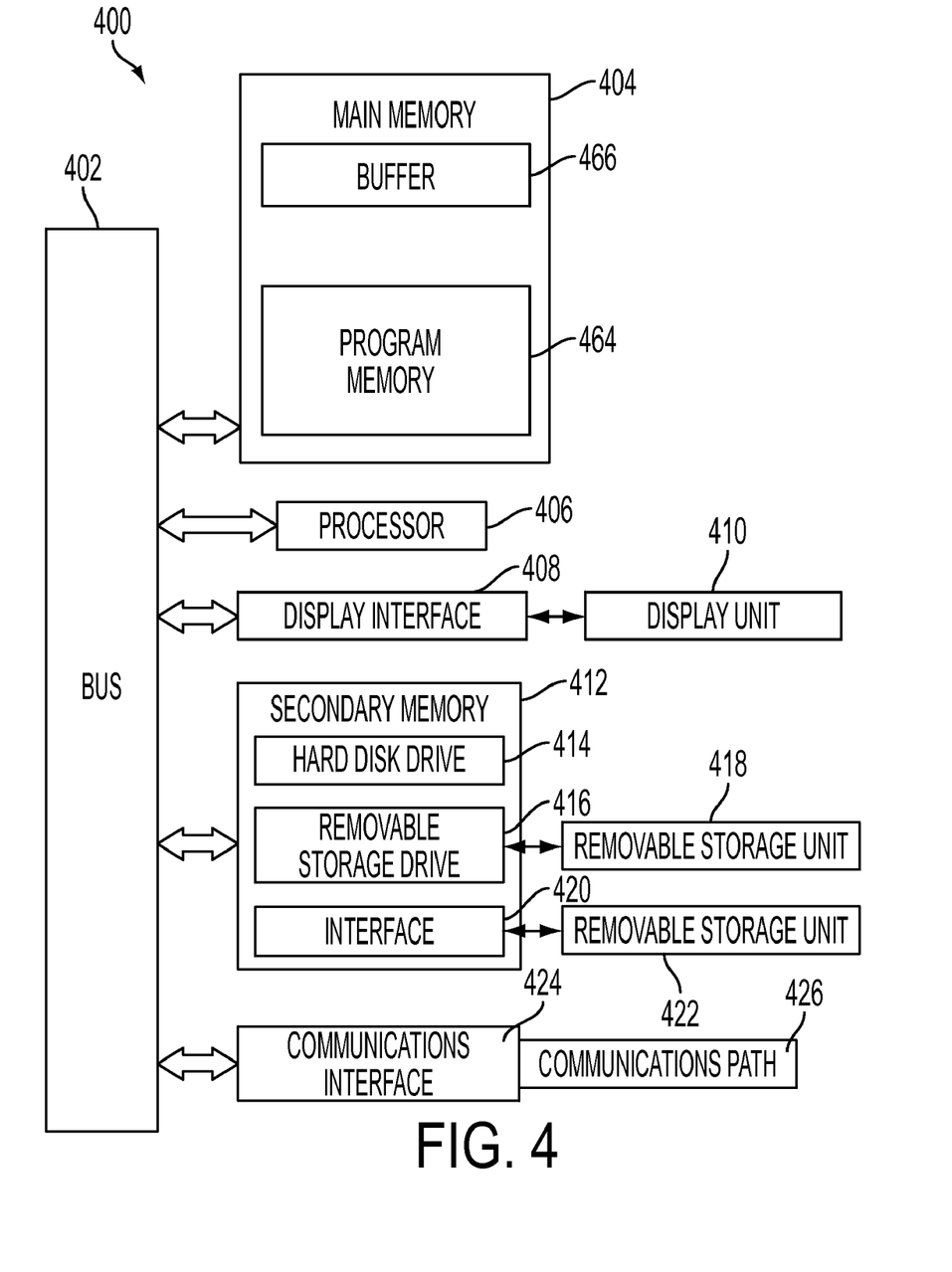
FIG. 4 illustrates a block diagram of one embodiment of a special purpose computer system useful for implementing one or more aspects of the present image resizing method.

Reference is now made to FIG. 4 which illustrates a block diagram of one example embodiment of a special purpose computer useful for implementing one or more aspects of the present method. Such a system could be implemented as a separate computer system, an electronic circuit, or an ASIC, for example. The nature of the implementation will depend on the processing environment wherein the present method finds its intended uses.

Special purpose computer system 400 includes processor 406 for executing machine executable program instructions for carrying out all or some of the present method. The processor is in communication with bus 402. The system includes main memory 404 for storing machine readable instructions. Main memory may comprise random access memory (RAM) to support reprogramming and flexible data storage. Buffer 466 stores data addressable by the processor.

Program memory 464 stores program instructions. A display interface 408 forwards data from bus 402 to display 410. Secondary memory 412 includes a hard disk 414 and storage device 416 capable of reading/writing to removable storage unit 418, such as a floppy disk, magnetic tape, optical disk, etc. Secondary memory 412 may further include other mechanisms for allowing programs and/or machine executable instructions to be loaded onto the processor. Such mechanisms may include, for example, a storage unit 422 adapted to exchange data through interface 420 which enables the transfer of software and data. The system includes a communications interface 424 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 426 which carries such signals and may be implemented using wire, cable, fiber optic, phone line, cellular link, RF, memory, or other means known in the arts.

Figure 5:
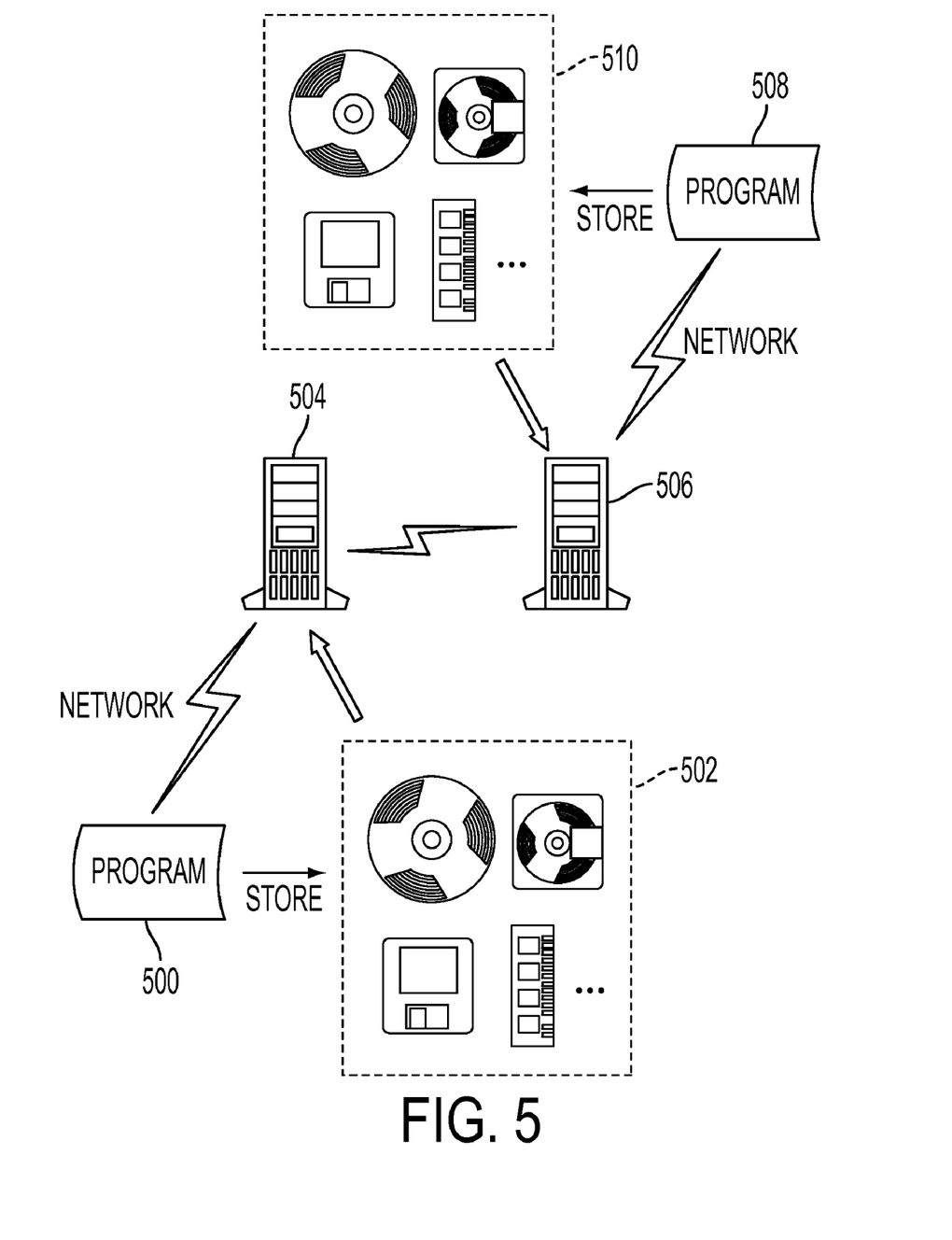
FIG. 5 is an explanatory diagram illustrating one example computer readable medium capable of storing machine readable instructions which, when mounted on a computer or a special purpose computer system, causes the system to perform one or more aspects of the present method.

Reference is now made to FIG. 5 which is an explanatory diagram illustrating one example of a computer readable storage medium capable of storing machine readable instructions which, when mounted on a computer or a special purpose computer system, causes the system to perform one or more aspects of the present method. The machine readable instructions may be modified by one computer and transferred to another computer.

In the illustrated embodiment, one or more computer programs 500 for carrying out the present method are loaded on a computer-readable storage media 502 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states or orientations in response to program instructions having been transferred to the media. The computer programs containing machine executable instructions of the present method can then be mounted on computer 504 and transferred or otherwise communicated to computer 506. The program instructions can then be off-loaded to another medium 508, in original form or modified, including data, and stored on storage media 510. Both of the computer systems include processors capable of executing machine readable program instructions. The processor may be placed in communication with an image scanning device (not shown) for receiving the pixel values directly therefrom.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein. Computer readable medium may additionally comprise information in a transitory state medium such as a network link or a network interface which may include a wired network or a wireless network which allows a computer to read such computer readable information.

It should be understood that the flow diagrams hereof are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in, and the like, as are known in the arts. Such an article of manufacture may further be shipped, sold, leased, or otherwise provided either alone or as part of an add-on, update, upgrade, or product suite by the assignee or a licensee hereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A computer implemented method for mapping an out of gamut RGB color to a surface of a color gamut, the method comprising:

retrieving, from a memory, an input point $x_c$ having $\{R_c, G_c, B_c\}$ values in RGB space, said input point $x_c$ being outside a surface of a color gamut of a target image output device;

determining a lightness value comprising:

$$\gamma = \tfrac{1}{3}(R_c + G_c + B_c);$$

determining a chroma vector comprising:

$$\vec{C} = \begin{bmatrix} C_r \\ C_g \\ C_b \end{bmatrix} = \begin{bmatrix} R_c - \gamma \\ G_c - \gamma \\ B_c - \gamma \end{bmatrix};$$

determining a minimum saturation and a maximum saturation of point $x_c$, respectively, comprising:

$$a_0 = \text{MIN}(C_r, C_g, C_b), \text{ and } a_2 = \text{MAX}(C_r, C_g, C_b);$$

calculating a new lightness value $\gamma'$ and a new chroma vector, $\vec{C'} = (C'_r, C'_g, C'_b)^T$, said new chroma vector being constrained to an input hue of point $x_c$, and wherein, in response to $(a_2-a_0)\geq 1$, scaling said chroma vector $\vec{C}$ to obtain said new chroma vector, $$\vec{C'} = \begin{bmatrix} C'_r \\ C'_g \\ C'_b \end{bmatrix} = \frac{1}{a_2 - a_0}\vec{C};$$

converting said new lightness value and said new chroma vector to $\{R'_c\ G'_c\ B'_c\}$ values; and providing said $\{R'_c\ G'_c\ B'_c\}$ values to an image processing system.

2. The method of claim 1, further comprising clipping said lightness value to a range between [0,1].

3. The method of claim 1, wherein calculating said new lightness value comprises:

in response to $(a_2-a_0)\geq 1$, $\gamma'=\frac{1}{2}(1+a_1)-\gamma$, where $a_1$ is an intermediate saturation given by: $a_1=-a_2-a_0$; otherwise, in response to $(a_2+\gamma)>1$, $\gamma'=1-(a_2+\gamma)$;

otherwise, in response to $(a_0+\gamma)<0$, $\gamma'=-a_0-\gamma$.

4. The method of claim 3, wherein, in response to said new lightness value being greater than 0, further comprising:

scaling said chroma vector, $$\vec{C} = \left(\frac{(1-\gamma-\sigma\gamma')}{(1-\gamma-\gamma')}\right)\vec{C};$$

and scaling said new lightness value, $\gamma'=\sigma\gamma'$, where $\sigma$ is a saturation parameter $0\leq\sigma\leq 1$.

5. The method of claim 3, wherein, in response to said new lightness value being less than zero, further comprising:

scaling said chroma vector, $$\vec{C} = \left(\frac{(\gamma+\sigma\gamma')}{(\gamma+\gamma')}\right)\vec{C};$$

and scaling said new lightness value, $\gamma'=\sigma\gamma'$, where $\sigma$ is a saturation parameter $0\leq\sigma\leq 1$.

6. The method of claim 1, wherein converting said new lightness value and said new chroma vector to $\{R'_c\ G'_c\ B'_c\}$ values comprises:

$$\begin{bmatrix} R'_c \\ G'_c \\ B'_c \end{bmatrix} = \begin{bmatrix} \gamma+\gamma' \\ \gamma+\gamma' \\ \gamma+\gamma' \end{bmatrix} + \begin{bmatrix} c'_r \\ c'_g \\ c'_b \end{bmatrix}.$$

7. A system for mapping an out of gamut RGB color to a surface of a color gamut, the system comprising:

a memory;

a storage medium for storing data; and a processor in communication with said memory and said storage medium, said processor executing machine readable instructions for performing:

receiving an input point $x_c$ having $\{R_c\ G_c\ B_c\}$ values in RGB space, said input point $x_c$ being outside a surface of a color gamut of a target image output device;

determining a lightness value comprising:

$\gamma=\frac{1}{3}(R_c+G_c+B_c)$;

determining a chroma vector comprising:

$$\vec{C} = \begin{bmatrix} C_r \\ C_g \\ C_b \end{bmatrix} = \begin{bmatrix} R_c-\gamma \\ G_c-\gamma \\ B_c-\gamma \end{bmatrix};$$

determining a minimum saturation and a maximum saturation of point $x_c$, respectively, comprising:

$a_0=\text{MIN}(C_r, C_g, C_b)$, and $a_2=\text{MAX}(C_r, C_g, C_b)$;

calculating a new lightness value $\gamma'$ and a new chroma vector, $\vec{C'}=(C'_r, C'_g, C'_b)^T$, said new chroma vector being constrained to an input hue of point $x_c$, and wherein, in response to $(a_2-a_0)\geq 1$, scaling said chroma vector $\vec{C}$ to obtain said new chroma vector, $$\vec{C'} = \begin{bmatrix} C'_r \\ C'_g \\ C'_b \end{bmatrix} = \frac{1}{a_2 - a_0}\vec{C};$$

converting said new lightness value and said new chroma vector to $\{R'_c\ G'_c\ B'_c\}$ values; and providing said $\{R'_c\ G'_c\ B'_c\}$ values to an image processing system.

8. The system of claim 7, further comprising clipping said lightness value to a range between [0,1].

9. The system of claim 7, wherein calculating said new lightness value comprises:

in response to $(a_2-a_0)\geq 1$, $\gamma'=\frac{1}{2}(1+a_1)-\gamma$, where $a_1$ is an intermediate saturation given by: $a_1=-a_2-a_0$; otherwise, in response to $(a_2+\gamma)>1$, $\gamma'=1-(a_2+\gamma)$; and otherwise, in response to $(a_0+\gamma)<0$, $\gamma'=-a_0-\gamma$.

10. The system of claim 9, wherein, in response to said new lightness value being greater than zero, further comprising:

scaling said chroma vector, $$\vec{C} = \left(\frac{(1-\gamma-\sigma\gamma')}{(1-\gamma-\gamma')}\right)\vec{C};$$

and scaling said new lightness value, $\gamma'=\sigma\gamma'$, where $\sigma$ is a saturation parameter $0\leq\sigma\leq 1$.

11. The system of claim 9, wherein, in response to said new lightness value being less than zero, further comprising:

scaling said chroma vector, $$\vec{C} = \left(\frac{(\gamma + \sigma\gamma')}{(\gamma + \gamma')}\right)\vec{C};$$

and scaling said new lightness value, $\gamma' = \sigma\gamma'$, where $\sigma$ is a saturation parameter $0 \leq \sigma \leq 1$.

12. The system of claim 7, wherein converting said new lightness value and said new chroma vector to $\{R'_c G'_c B'_c\}$ values comprises:

$$\begin{bmatrix} R'c \\ G'c \\ B'c \end{bmatrix} = \begin{bmatrix} \gamma + \gamma' \\ \gamma + \gamma' \\ \gamma + \gamma' \end{bmatrix} + \begin{bmatrix} c'_r \\ c'_g \\ c'_b \end{bmatrix}.$$

* * * * *